United States Patent [19]

Trullas

[11] 4,210,005
[45] Jul. 1, 1980

[54] APPARATUS FOR THE WET PROCESSING OF TEXTILE FABRICS IN ROPE FORM

[75] Inventor: Isidro F. Trullas, Tarrasa, Spain

[73] Assignee: Argelich, Termes y Cia., S.A., Tarrasa, Spain

[21] Appl. No.: 29,504

[22] Filed: Apr. 12, 1979

[30] Foreign Application Priority Data

Apr. 28, 1978 [ES] Spain .................................. 469.262

[51] Int. Cl.² ......................... D06B 3/24; D06B 3/28
[52] U.S. Cl. ..................................... 68/148; 68/152; 68/158; 68/177
[58] Field of Search ................ 68/148, 152, 158, 177, 68/178

[56] References Cited

U.S. PATENT DOCUMENTS

| 4,006,612 | 2/1977 | Thies .................................. 68/152 X |
| 4,019,351 | 4/1977 | Mizutani et al. ........................ 68/177 |

FOREIGN PATENT DOCUMENTS 2620387 11/1977 Fed. Rep. of Germany ............ 68/177

Primary Examiner—Philip R. Coe
Attorney, Agent, or Firm—Sughrue, Rothwell, Mion, Zinn and Macpeak

[57] ABSTRACT

Apparatus for the wet processing of fabric in rope form wherein the storage chamber portion containing the major portion of the fabric to be processed comprises a tubular portion capable of rotation about its longitudinal axis and having means for producing the longitudinal feed of the fabric rope, a low bath ratio between the processing bath and fabric being obtained.

9 Claims, 12 Drawing Figures

APPARATUS FOR THE WET PROCESSING OF TEXTILE FABRICS IN ROPE FORM

FIELD OF THE INVENTION

This invention relates to apparatus for the wet processing of fabrics in rope form of the type in which the fabric in endless rope form, together with the processing bath, is moved continuously through a closed, pressurised or non-pressurised circuit, along an outgoing path wherein the fabric circulates at a higher rate of travel, mainly contained in a transport conduit, and along a return path where the fabric circulates at a slower rate of travel, contained in a storage chamber portion which, at any one time, contains the major portion of the fabric to be processed, there being hydraulic means for propelling the fabric along the transport conduit and possibly mechanical means, adapted to cooperate with said hydraulic means to remove the fabric from the storage chamber portion and prepare it anew to be propelled by the hydraulic propelling means, this fabric circuit being combined with a circuit for propelling, conditioning and distributing the processing bath.

In known apparatus of the above type, high processing bath ratios have been used up to now, whereas lower bath ratios are presently being used.

One of the solutions adopted to be able to work with low bath/fabric ratios has been to shape the storage chamber portion in such a way that at least in a part thereof the fabric contained therein is submerged in the processing bath and that, in said part, the bath volume is sufficient to propel the fabric rope along by flotation thereof in the bath, as described in U.S. Pat. No. 4,143,527 of the same applicant.

However, currently these low bath/fabric ratios are still high for the present circumstances wherein they have excessive repercussions on the energy cost of heating large masses of water and the purification of the resulting waste liquors.

Two systems have been adopted to provide for the circulation of the fabric rope through the storage chamber portion without the requirement of a sufficient bath volume allowing it to float. One of them comprises disposing the storage chamber portion in an annular form and causing it to rotate around its circumferential axis, said chamber being formed by two independent parts separated by a complete peripheral space and having dimensions so as to allow for the entry of the fabric and to contain it throughout the whole of the storage stage, as described in the German patent application No. P 24 27 415.5 of Alfred Thies junior. Another system consists of disposing the floor of the storage chamber portion containing the fabric rope as a conveyor belt circulating in an opposite direction to that of the transport conduit, whereby the fabric is moved on said conveyor belt without need of any processing bath, as described in German Utility Model specification No. GM 75 19948 of Messrs Espa Edelstahl-Apparatebau, GmbH.

The object of the invention is to provide for the movement of the fabric rope in the storage chamber portion by way of a mechanical arrangement differing from those described above and independent of the level of processing bath in said storage chamber portion.

SUMMARY OF THE INVENTION

In accordance with the foregoing, the invention is characterised in that the storage chamber portion is constituted by an open ended tubular body capable of rotation about a longitudinal axis, said ends being arranged respectively with the leading end and the trailing end of the higher speed portion of the fabric rope circuit, said rotary circular body being provided with means adapted for causing the rotary movement of said tubular body to propel the fabric rope situated therein in the longitudinal direction thereof.

BRIEF DESCRIPTION OF THE DRAWING

To facilitate the understanding of the foregoing, reference is made hereinafter to the accompanying drawing, which is to be deemed as devoid of any limitative effect. In the drawing.

DETAILED DESCRIPTION OF THE INVENTION

Figure 1:
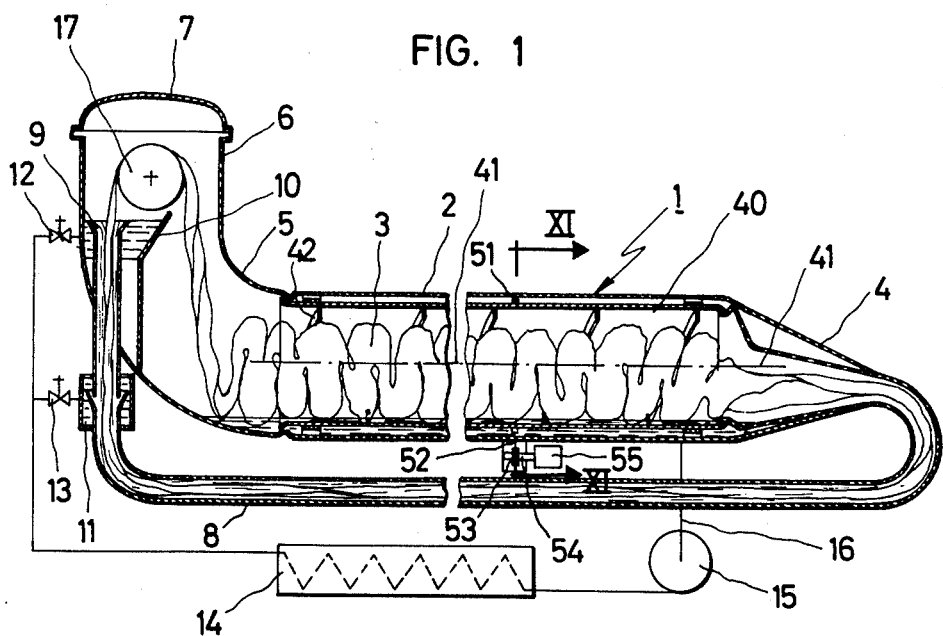
FIG. 1 is a diagrammatic longitudinal section view of a fabric rope wet processing apparatus according to the invention of the pressurisable type.

The apparatus of FIG. 1 comprises a conventional closed vessel 1, adapted for working under pressure or in open bath, comprising a centre tubular portion 2, forming the storage chamber for the fabric rope 3. Attached to said centre portion 2 there are a terminal tapered portion 4 through which the fabric 3 is delivered to the portion 2 and an exit elbow portion 5 curved upwardly and attached in turn to an upper portion 6 provided with a loading and unloading cover 7. The fabric rope 3 moves relatively slowly through the storage chamber.

The upper portion 6 and the terminal tapered portion 4 are in communication with one another by way of a transport conduit 8 through which the fabric rope is propelled relatively rapidly. The conduit 8 extends below the storage chamber and within the upper portion 6 it forms a mouth 9 forming, together with a chamber 10, a hydraulic arrangement for propelling the fabric by overflow.

On the other hand, the said transport conduit 8 is provided, at a point outside the upper portion 6, with an annular jet chamber 11 which constitutes a hydraulic device for propelling the fabric by jetting. Both chambers 10 and 11 are in communication, through respective control valves 12 and 13, with the processing bath circuit which comprises, also, a heat exchanger 14, pump 15 and conduit 16 for withdrawing the bath from inside the closed vessel.

Moreover, the apparatus is provided with a winch 17, which may be fitted with a motor, to assist in feeding the fabric rope 3 from the storage chamber to the transport conduit 8.

Figure 2:
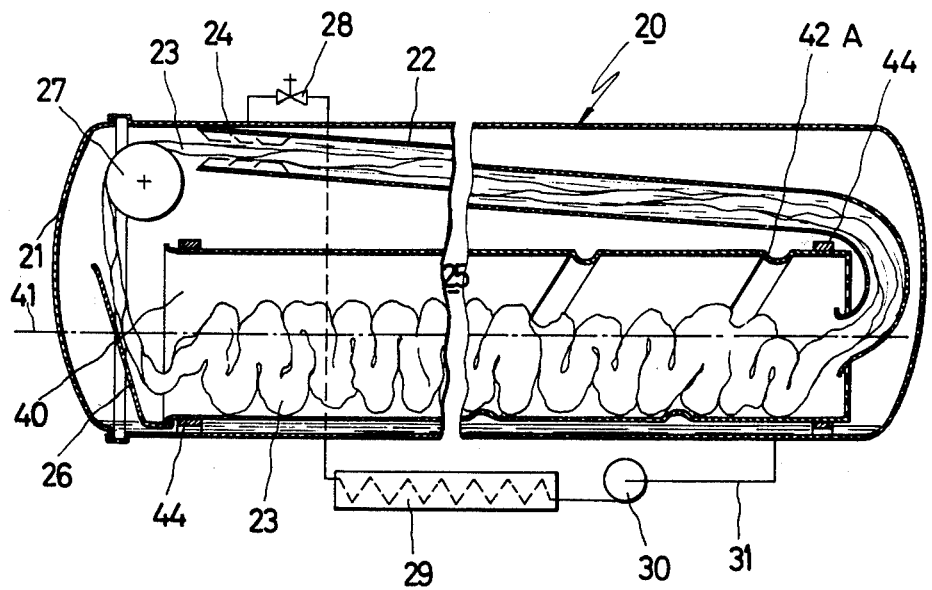
FIG. 2 is a diagrammatic longitudinal section view of a modified embodiment of the apparatus according to the invention, also of the pressurisable type.

The apparatus of FIG. 2 also comprises conventionally a closed vessel 20, provided with a cover 21 and adapted for pressurised operation. In the interior thereof there is a transport conduit 22 for the fabric 23, provided with a hydraulic device 24 for propelling the fabric by jetting, a storage chamber 25 for the fabric 23, a baffle 26 and a winch 27, which may be equipped with a motor. The hydraulic jet device 24 is in communication through a control valve 28 with a heat exchanger 29, pump 30 and a conduit 31 for withdrawing the bath from inside the closed vessel 20.

Both of the above described apparatus are provided with a rotary tubular body 40, within the fabric rope storage chamber portion thereof, which actually constitutes the said storage chamber portion which, in the prior art, consisted of the centre tubular body 2 itself or of a trough or the like situated in the bottom of the closed vessel 20.

The rotary tubular body 40 is provided with means for propelling the fabric rope 3, 23 contained in said rotary tubular body 40, in the longitudinal direction of said rotary tubular body 40, as the latter rotates around its longitudinal axis, without requiring that the processing bath level be sufficiently high to cause flotation of the fabric and to allow it to be pulled along from one end by the combined action of the winch 17, 27 and the hydraulic propelling means 10, 11, 24.

The said fabric rope propelling means through the storage chamber portion comprise the disposal of helical ribs 42 or 42A on the inner surface of the rotary tubular body 40 so that the rotation around the longitudinal axis 41 thereof causes the fabric rope contained in the transport conduit 8, 22 to move along.

Figure 3:
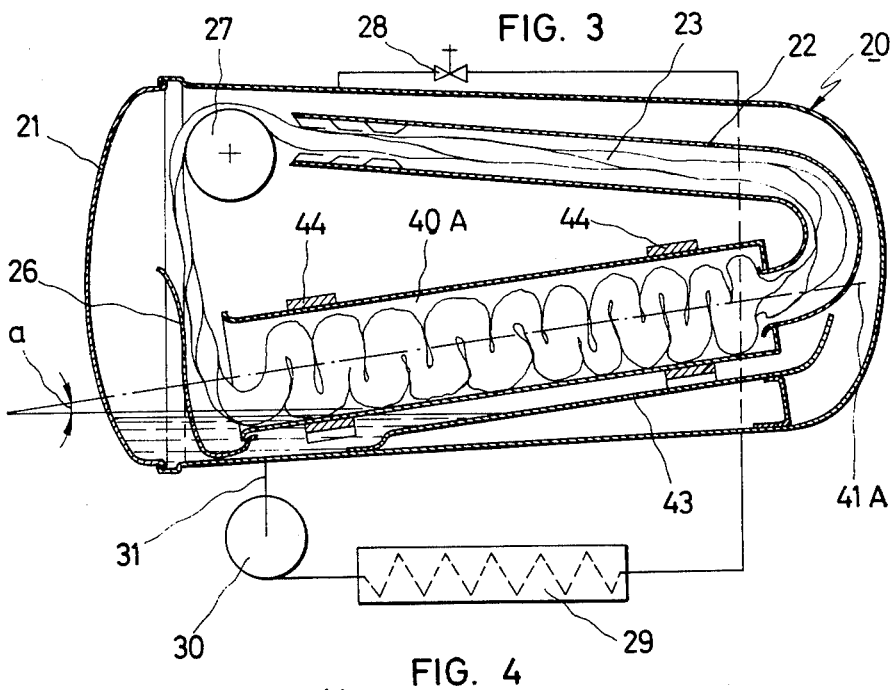
FIG. 3 is a diagrammatic longitudinal section view of a further modified embodiment of the apparatus according to the invention.

These means may also be formed by a spatial disposition of the rotary tubular body 40, consisting of locating its longitudinal axis on an inclined plane, as in the apparatus shown in FIG. 3, in which the longitudinal axis 41A forms an angle a with the horizon. This apparatus is similar to that of FIG. 2, the most outstanding differences being the inclined position of the rotary tubular body 40A and a lower wall 43 for reducing the processing bath chamber, with a view to retaining a minimum level sufficient for connecting the suction conduit 31 of the pump 30. This inclination of the axis is compatible with the presence of the helical ribs 42, 42A.

In the embodiments of the invention, the horizontal rotary tubular body 40 and inclined rotary tubular body 40A are provided with means for enabling their rotation around their longitudinal axes 41 and 41A, there being shown in the Figures means consisting of running rings 44 bearing on rollers, it being possible to use any other conventional mechanical means.

Figure 4:
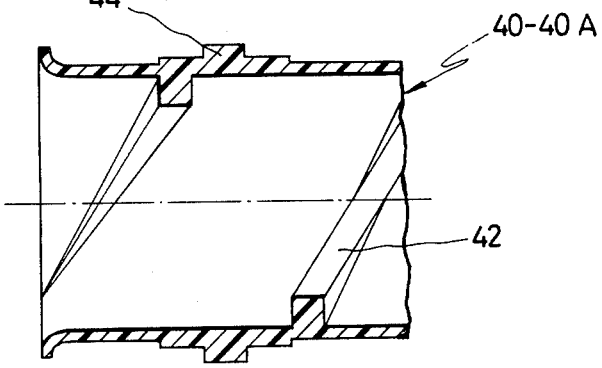
FIG. 4 is a partial diametral section view of a rotary tubular section moulded from plastics material and which may be self-supporting or be supplemented by a metal bearing structure.

The rotary tubular body 40 or 40A may be made from plastics material (FIGS. 4 and 5) or from metal.

Figure 5:
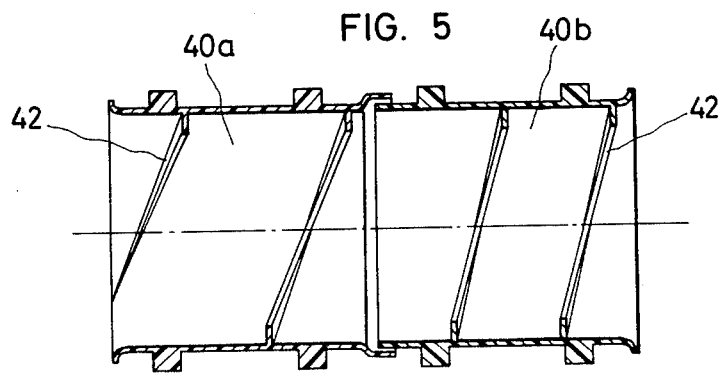
FIG. 5 is a view of a rotary tubular portion formed by the association of two independent tubular portion.

Said rotary tubular body 40, 40A may also be constituted by the association of two or more tubular bodies 40a and 40b, as shown in FIG. 5, in the case of a rotary tubular body having a horizontal axis 41, it also being possible to apply this arrangement to the inclined axis embodiment. Said bodies 40a and 40b may be arranged for independent rotation.

Figure 6:
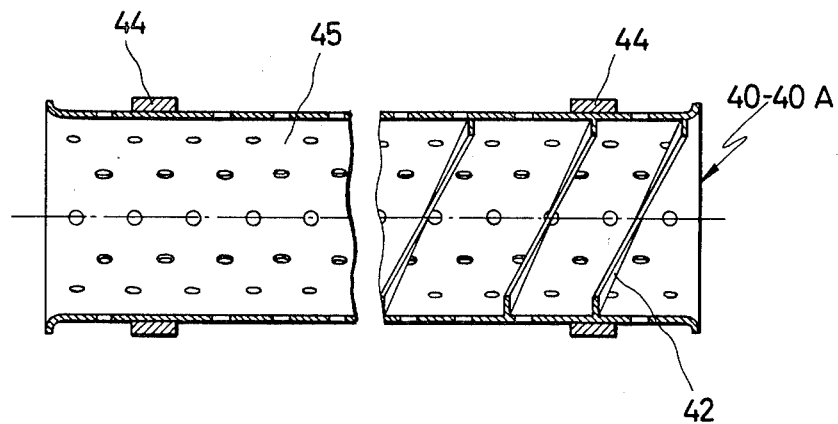
FIG. 6 is a partial diametral section view of a rotary tubular portion having a perforated wall, in which the lefthand portion does not have helical ribs, whereas the righthand portion does have such helical ribs.
Figure 7:
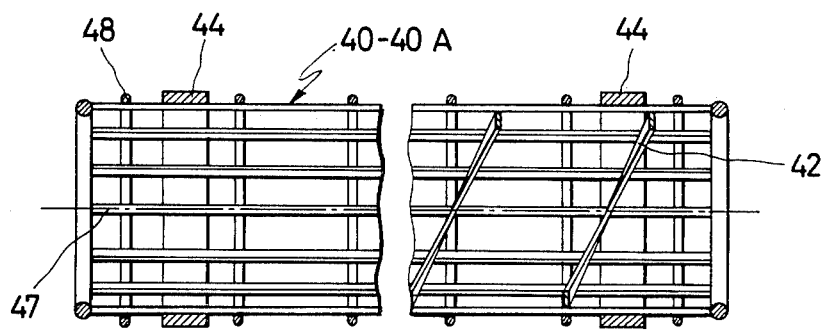
FIG. 7 is a partial diametral section view of a rotary tubular portion having a lattice wall, in which the lefthand portion does not have helical ribs, whereas the righthand portion does have such helical ribs.
Figure 8:
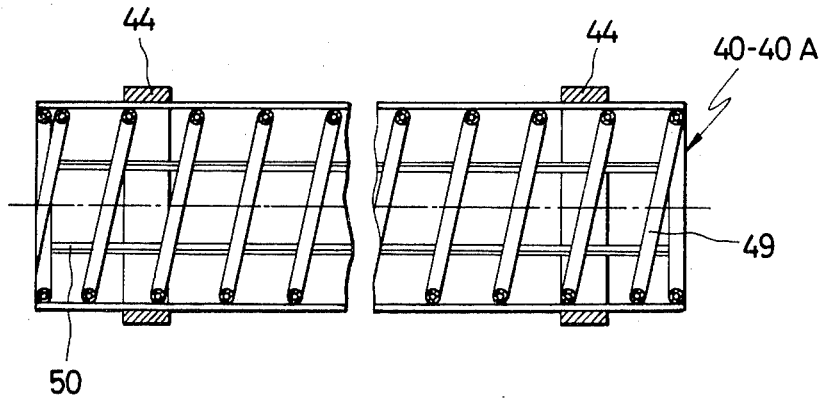
FIG. 8 is a partial diametral section view of a rotary tubular portion having a wall formed by cross-braced helical rib to constitute a self-supporting body.

The rotary tubular body 40, 40a may have solid surface walls (FIGS. 1, 2, 4, 9, 10, 11 and 12) or may have a perforated wall 45 (FIG. 6). The rotary tubular body may also be enclosed with a lattice formed by stringers 47 and hoops 48 (FIG. 7). Likewise, the said wall may be constituted by a strong section 49 disposed helically and longitudinally braced with stringers 50 to form a self-supporting body (FIG. 8).

In the case of a horizontal rotary tubular body 40, there are helical ribs 42 as shown in FIGS. 1 and 2 and at the righthand side of FIGS. 6 and 7, such ribs consisting of separate sections attached to the inner surface of the tubular body (FIGS. 1, 6 and 7) or stampings 42A made in the sheet material of the rotary tubular body 40 (FIG. 2).

Figure 9:
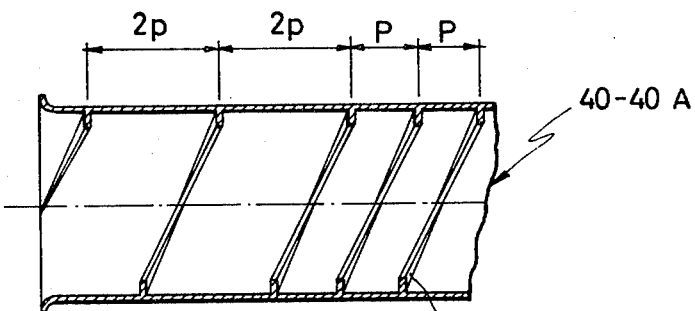
FIG. 9 is a partial diametral section view of a rotary tubular portion, in which the pitch of the spiral formed by the helical ribs is not constant.
Figure 10:
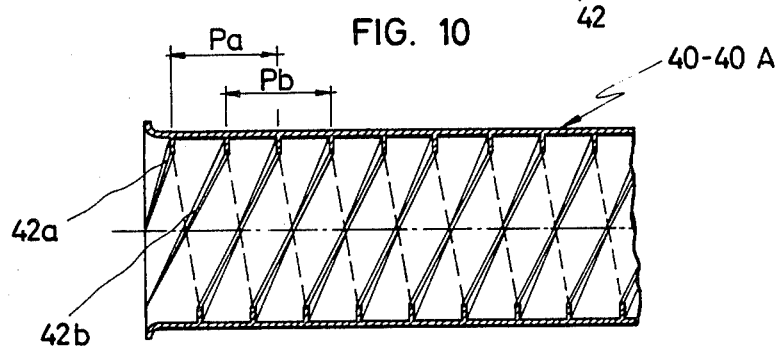
FIG. 10 is a partial diametral section view of a rotary tubular portion in which the helical ribs form two spirals.

When helical ribs 42, 42A are provided, the spiral they form may cover the full length of the tubular body (FIG. 1) or a portion thereof (FIG. 2) at the same time as, in both cases, the pitch between two consecutive loops of the spiral may be constant or variable as seen in FIG. 9, wherein one part has a pitch "p" and the other a pitch "2p" and, in turn, the number of spirals formed by the helical ribs may be more than one, as seen in FIG. 10, in which two spirals 42a and 42b of equal pitch pa and pb are seen.

Figure 11:
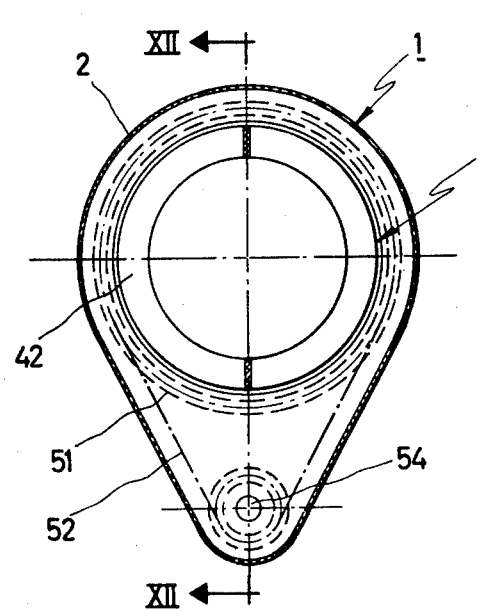
FIG. 11 is a section view along the lines XI—XI of FIG. 1.
Figure 12:
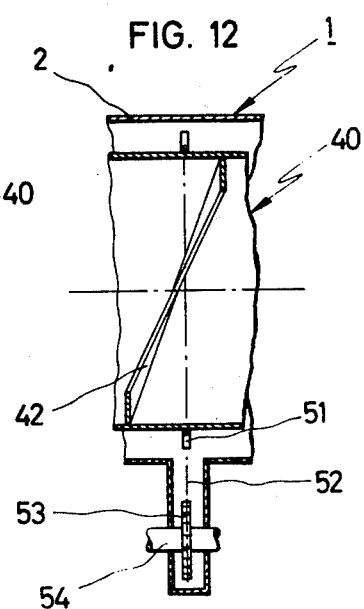
FIG. 12 is a partial section view along the lines XII—XII of FIG. 11.

Finally, in FIGS. 1, 11 and 12 there is shown an embodiment of the rotary drive of the rotary tubular body 40 and 40A, by way of a crown sprocket wheel 51, a roller chain 52 and a sprocket pinion 53 mounted on a shaft 54 driven by a drive unit 55.

What I claim is:

1. An apparatus for the wet processing of a textile fabric in endless rope form, said apparatus including means defining a closed circuit path for such a fabric and a portion of a processing bath absorbed and carried thereby, comprising a storage chamber and a transport conduit, the storage chamber defining a return portion of said path through which said fabric circulates at a relatively slow rate of travel and wherein a major portion of said fabric resides at any given time, and the transport conduit defining an outgoing portion of said path through which said fabric circulates at a relatively high rate of travel, hydraulic means for propelling the fabric along the transport conduit, mechanical means for removing the fabric from the storage chamber and feeding it to the hydraulic means, and a fluid handling circuit for pumping, conditioning and distributing the processing bath, characterized by:

(a) the storage chamber comprising a tubular body having two open ends and mounted for rotation about a longitudinal axis thereof, (b) means for rotating said tubular body, (c) the ends of said tubular body being disposed, respectively, proximate a leading end and a trailing end of said transport conduit, and (d) means associated with said tubular body for advancing the fabric longitudinally therethrough in response to the rotation of said tubular body.

2. An apparatus according to claim 1, wherein the means for advancing the fabric comprises helical ribs extending from the inner surface of said tubular body.

3. An apparatus according to claim 2, wherein the helical ribs form a spiral extending along the entire length of said tubular body.

4. An apparatus according to claim 2, wherein the helical ribs form a spiral extending along part of the length of said tubular body.

5. An apparatus according to claim 3 or claim 4, wherein the helical ribs form two spirals.

6. An apparatus according to claim 3 or claim 4, wherein the pitch of the spiral formed by the helical ribs is not constant.

7. An apparatus according to claim 1, wherein the means for advancing the fabric comprises means mounting said tubular body at an angle whereat its longitudinal axis in inclined to the horizontal.

8. An apparatus according to claim 1, wherein the longitudinal axis of said tubular body is horizontal.

9. An apparatus according to claims 1, 2, 7 or 8, wherein said tubular body comprises two associated tubular members mounted for independent rotation.

* * * * *